(12) United States Patent
Kitazawa

(10) Patent No.: US 11,379,171 B2
(45) Date of Patent: Jul. 5, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yuka Kitazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/126,237

(22) Filed: Dec. 18, 2020

(65) Prior Publication Data

US 2021/0373830 A1    Dec. 2, 2021

(30) Foreign Application Priority Data

Jun. 1, 2020 (JP) .............................. JP2020-095490

(51) Int. Cl.
*G06F 3/12* (2006.01)
*G06Q 10/06* (2012.01)

(52) U.S. Cl.
CPC .......... *G06F 3/1285* (2013.01); *G06F 3/1275* (2013.01); *G06F 3/1296* (2013.01); *G06Q 10/06* (2013.01)

(58) Field of Classification Search
None
See application file for complete search history.

(56) References Cited

U.S. PATENT DOCUMENTS

| 2014/0118781 | A1* | 5/2014 | Kobayashi | G06F 3/0486 |
| | | | | 358/1.15 |
| 2015/0043035 | A1* | 2/2015 | Iida | G06K 15/002 |
| | | | | 358/1.15 |
| 2016/0306596 | A1* | 10/2016 | Yasuda | G06F 3/1292 |
| 2020/0293239 | A1* | 9/2020 | Kawasaki | G06F 3/1207 |
| 2020/0409634 | A1* | 12/2020 | Satomi | G06F 3/1285 |
| 2021/0058528 | A1* | 2/2021 | Deleverio | H04N 1/00411 |

FOREIGN PATENT DOCUMENTS

| JP | H8-180110 A | 7/1996 |
| JP | 2005-92364 A | 4/2005 |
| JP | 5311136 B2 | 10/2013 |

* cited by examiner

*Primary Examiner* — Fan Zhang
(74) *Attorney, Agent, or Firm* — Oliff PLC

(57) ABSTRACT

An information processing apparatus includes a processor configured to determine progress of each of two or more processes included in a workflow and display a second image that is a single image generated based on first images respectively representing the two or more processes and the determined progress.

13 Claims, 13 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-095490 filed Jun. 1, 2020.

BACKGROUND (i) Technical Field

The present disclosure relates to an information processing apparatus and a non-transitory computer readable medium.

(ii) Related Art

For example, Japanese Unexamined Patent Application Publication No. 8-180110 discloses a method for defining a business process in which a display manner of an icon is changed in accordance with a verified result. In addition, Japanese Patent No. 5311136 discloses a technique for changing a display manner such as the thickness of a frame line of an icon depending on an activity status. Japanese Unexamined Patent Application Publication No. 2005-92364 discloses a workflow execution supporting apparatus by which a form processing status in each processing stage may be checked with ease between offices having different workflow manners.

SUMMARY

Aspects of non-limiting embodiments of the present disclosure relate to allowing a user to grasp, in a single image representing a workflow, a process with delayed processing in the workflow.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to determine progress of each of two or more processes included in a workflow and display a second image that is a single image generated based on first images respectively representing the two or more processes and the determined progress.

BRIEF DESCRIPTION OF THE DRAWINGS

An exemplary embodiment of the present disclosure will be described in detail based on the following figures, wherein.

DETAILED DESCRIPTION

Exemplary Embodiment

Configuration of Information Processing System

Figure 1:
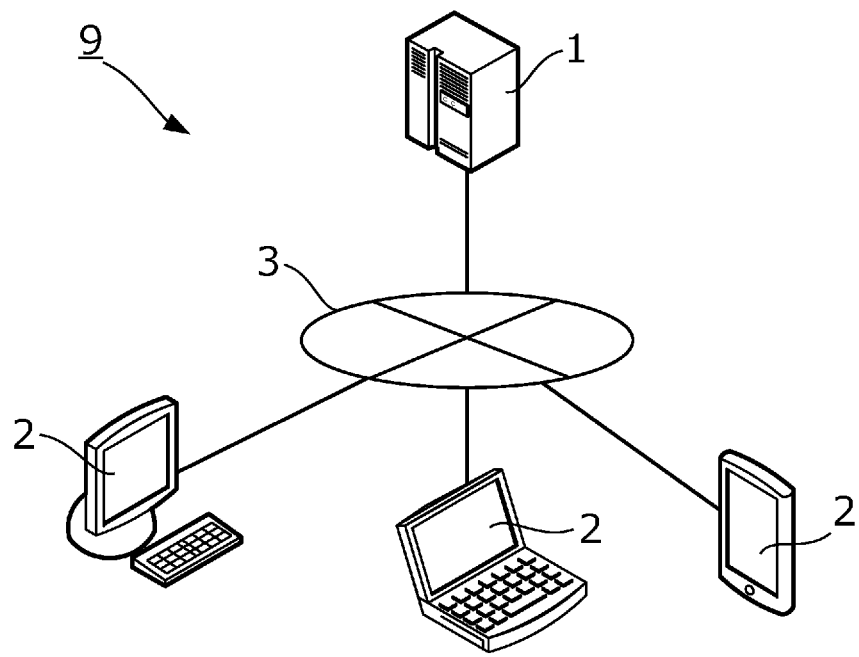
FIG. 1 illustrates an example of an overall configuration of an information processing system.

FIG. 1 illustrates an example of an overall configuration of an information processing system 9. The information processing system 9 illustrated in FIG. 1 is a system that monitors user operations and manages documents to be used by users. As illustrated in FIG. 1, the information processing system 9 includes an information processing apparatus 1, terminals 2, and a communication line 3.

The information processing apparatus 1 is an apparatus that manages a workflow. For example, the information processing apparatus 1 is a computer.

The terminals 2 are terminal apparatuses operated by respective users of the information processing system 9 and are, for example, a smartphone, a personal computer, and the like. The terminals 2 may also be apparatuses that accept a user operation and perform processing related to an image, such as an image forming apparatus, an image reading apparatus, a facsimile, and a copier.

The communication line 3 is a line that communicably connects the information processing apparatus 1 and the terminals 2. The communication line 3 may be, for example, a local area network (LAN), a wide area network (WAN), the Internet, or a combination thereof. In addition, the communication line 3 may also include a public switched telephone network (PSTN), an integrated services digital network (ISDN), or the like.

Note that the numbers of information processing apparatuses 1, terminals 2, and communication lines 3, in the information processing system 9 are not limited to those illustrated in FIG. 1. For example, the information processing apparatus 1 may be configured by a cluster system in which functions are shared by plural apparatuses.

Configuration of Information Processing Apparatus

Figure 2:
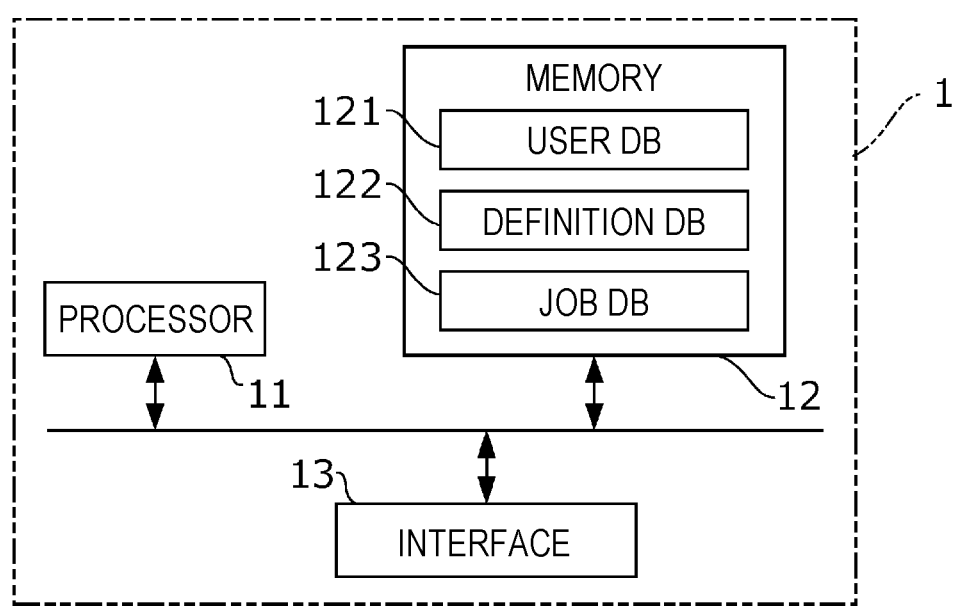
FIG. 2 illustrates an example of the configuration of an information processing apparatus.

FIG. 2 illustrates an example of the configuration of the information processing apparatus 1. The information processing apparatus 1 illustrated in FIG. 2 includes a processor 11, a memory 12, and an interface 13. That is, the information processing apparatus 1 is an example of an information processing apparatus including a memory and a processor. These components are communicably connected by a bus, for example.

The processor 11 reads and executes a program stored in the memory 12 to control the units of the information processing apparatus 1. The processor 11 is, for example, a central processing unit (CPU).

The interface 13 is a communication line that communicably connects the information processing apparatus 1 to the terminals 2 via the communication line 3 with or without wires.

The memory 12 is a storage that stores an operating system, various programs, data, and the like to be read in the processor 11. The memory 12 includes a random access memory (RAM) or a read only memory (ROM). Note that the memory 12 may further include a solid state drive, a hard disk drive, or the like. In addition, the memory 12 stores a user database (DB) 121, a definition DB 122, and a job DB 123.

Figure 3:
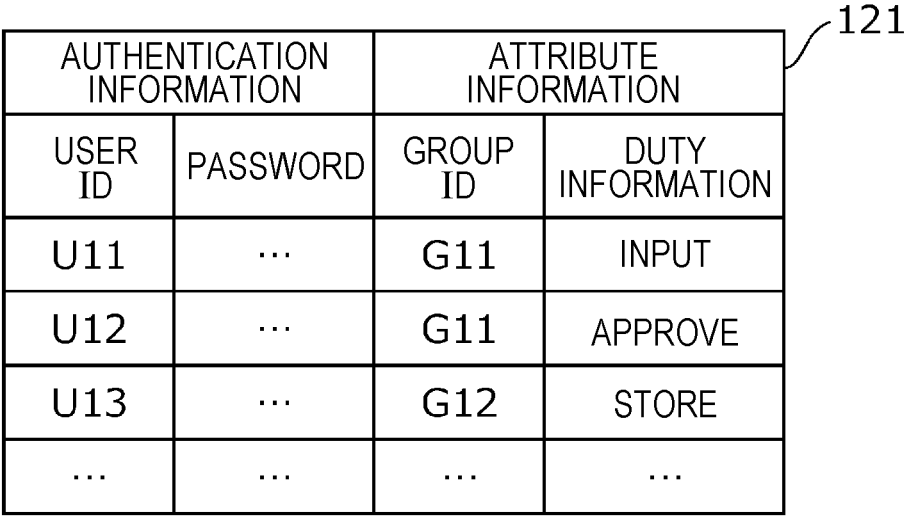
FIG. 3 illustrates an example of a user database (DB)

FIG. 3 illustrates an example of the user DB 121. The user DB 121 illustrated in FIG. 3 is a database that stores authentication information to be used for authentication of a user of the information processing system 9 and attribute information indicating the user's attribute.

In the user DB 121 illustrated in FIG. 3, the authentication information is a set of a user ID and a password. The user ID is identification information for identifying each user of the information processing system 9. The password is a character string or the like that the user identified by the corresponding user ID knows. In the user DB 121 illustrated in FIG. 3, the attribute information includes a group ID and duty information. The group ID is identification information for identifying a group such as a post or a project of the user identified by the corresponding user ID. Plural group IDs may be written in the group ID field. The duty information is information defining the duty range of the user identified by the corresponding user ID.

Figure 4:
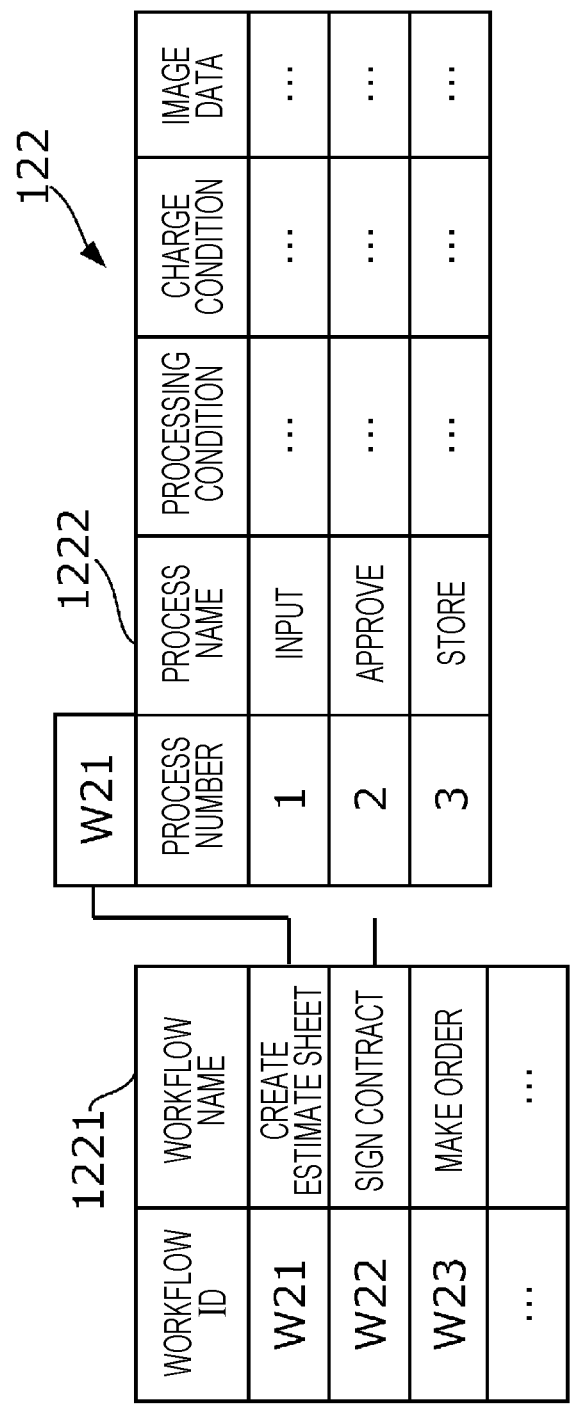
FIG. 4 illustrates an example of a definition DB.

FIG. 4 illustrates an example of the definition DB 122. The definition DB 122 is a database that stores definitions of workflows treated by the information processing apparatus 1. The definition DB 122 illustrated in FIG. 4 includes a workflow table 1221 and process tables 1222.

The workflow table 1221 is a table that stores workflow IDs, which are identification information for identifying the respective workflows, and workflow names, which are names of the workflows, in association with each other. For example, in the workflow table 1221 illustrated in FIG. 4, the name of the workflow identified by the workflow ID "W21" is the workflow name "create estimate sheet".

In the workflow table 1221, each of the listed workflow IDs is associated with a corresponding one of the process tables 1222 in a one-to-one relationship. The process table 1222 is a table that stores information on each of two or more processes included in a workflow identified by the associated workflow ID. The process table 1222 stores items such as a process number, a process name, a processing condition, a charge condition, and image data, in association with one another.

In the process table 1222, the process number is identification information for identifying each of two or more processes included in the workflow identified by the associated workflow ID and is a number indicating a processing order of the process.

The process name is the name of the process. The processing condition is a condition for performing processing for the process, a condition defining the following process after the processing, or the like. For example, in some workflows for applying purchase of a product, the post of an approver or the number of approvers may change depending on the price of the product. In this case, in the processing condition field, a branch condition and branched processes are written.

The charge condition is information indicating the condition of a user who is able to be in charge of the process identified by the corresponding process number. The charge condition includes details written for the attribute information in the user DB 121. The image data is image data for causing a terminal 2 to display an image (referred to as first image) representing the corresponding process.

For example, the process table 1222 illustrated in FIG. 4 is a table associated with the workflow ID "W21", and the workflow identified by this is a workflow in which three processes with the process names "input", "approve", and "store" are to be processed in this order.

Figure 5:
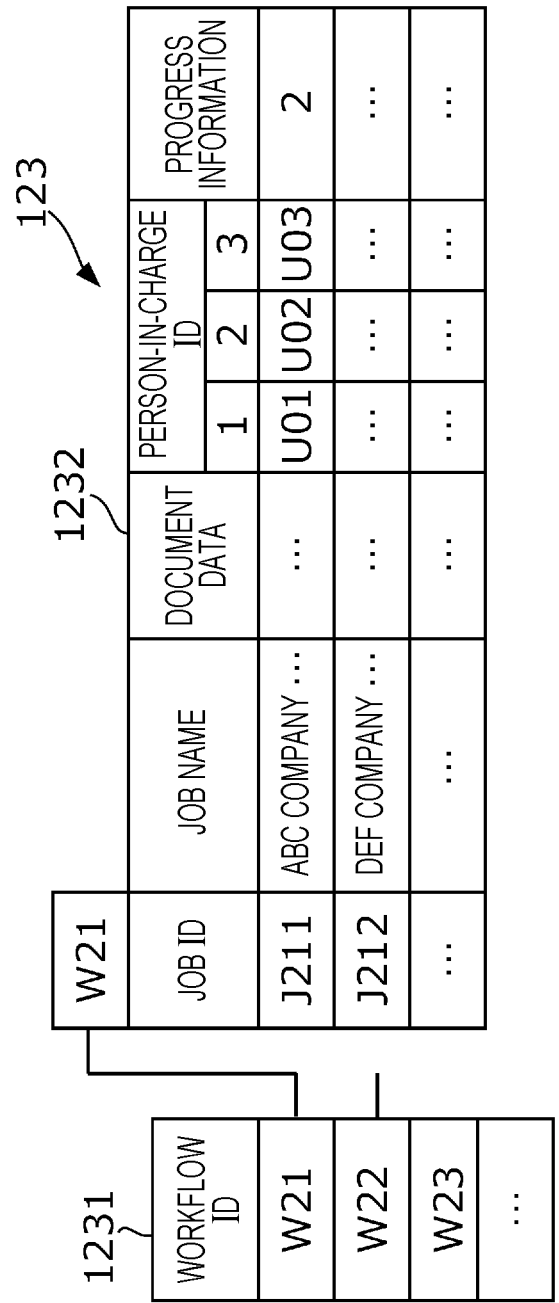
FIG. 5 illustrates an example of a job DB.

FIG. 5 illustrates an example of the job DB 123. The job DB 123 is a database that stores individual jobs, together with progress thereof, registered to be processed in accordance with any of the workflows treated by the information processing system 9. The job DB 123 illustrated in FIG. 5 includes a workflow list 1231 and a job table 1232.

The workflow list 1231 is a list of the above workflow IDs. Each of the workflow IDs listed in the workflow list 1231 is associated with the job table 1232. The job table 1232 stores jobs each of which is to be processed in accordance with a workflow identified by an associated workflow ID. The job table 1232 stores a job ID, a job name, document data, person-in-charge ID, and progress information, in association with one another.

In the job table 1232 illustrated in FIG. 5, the job ID is identification information for identifying each job. The job name is the name of the job identified by the corresponding job ID. The document data is data indicating details of a document to be transferred in accordance with a workflow in the corresponding job. The person-in-charge ID is a user ID indicating each user who is in charge of a corresponding process in the corresponding job. The progress information is information indicating progress of the corresponding job.

For example, the job table 1232 illustrated in FIG. 5 is associated with the workflow ID "W21". That is, each job written in the job table 1232 is processed in accordance with the workflow identified by the workflow ID "W21". In addition, in the job table 1232, the job identified by the job ID "J211" has the job name "ABC company . . . ", and a person in charge of the process with the process number "1" is the user identified by the user ID "U01". Furthermore, the progress information of this job is "2". This means that this job is in a standby state in the process with the process number "2". Note that each person is not necessarily in charge of a different process, and the same user may be set as a person in charge of plural processes.

Note that in a case where the information processing system 9 includes a document managing apparatus that manages a document to be processed in a workflow, the above job table 1232 may store, in place of the document data, information such as a pass or a uniform resource identifier (URI) indicating where the individual document is stored in the document managing apparatus. In this case, by using the pass or URI read from the job table 1232, the processor 11 of the information processing apparatus 1 may request the document managing apparatus, via the communication line 3, for the document stored therein.

Configuration of Terminal

Figure 6:
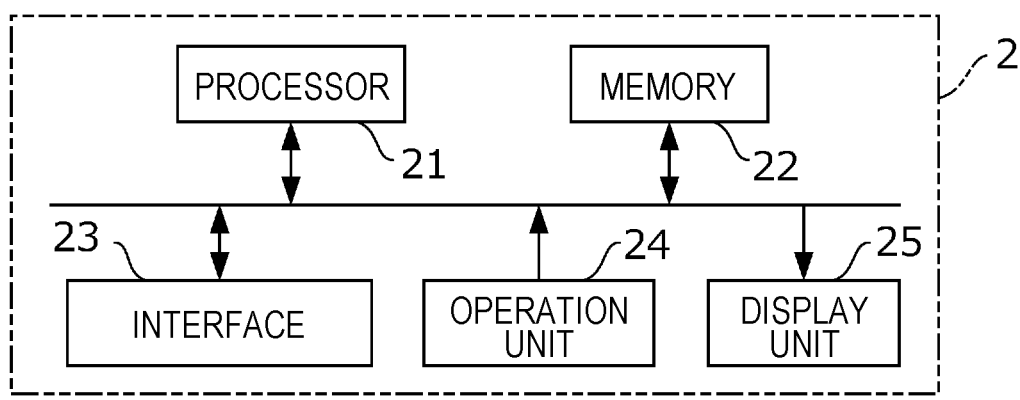
FIG. 6 illustrates an example of the configuration of a terminal.

FIG. 6 illustrates an example of the configuration of a terminal 2. The terminal 2 illustrated in FIG. 6 includes a processor 21, a memory 22, an interface 23, an operation unit 24, and a display unit 25. These components are communicably connected to one another via a bus, for example.

The processor 21 reads and executes a program stored in the memory 22 to control the units of the terminal 2. The processor 21 is, for example, a CPU.

The interface 23 is a communication line that communicably connects the terminal 2 and the information processing apparatus 1 to each other via the communication line 3 with or without wires.

The operation unit 24 includes operators such as an operation button, a keyboard, a touch panel, and a mouse for issuing various instructions, and accepts an operation to send a signal in accordance with the operation to the processor 21.

The display unit 25 includes a display screen such as a liquid crystal display and displays an image under control of the processor 21. On the display screen, a transparent touch panel in the operation unit 24 may be superposed.

The memory 22 is a storage that stores an operating system, various programs, data, and the like to be read in the processor 21. The memory 22 includes a RAM or a ROM. Note that the memory 22 may further include a solid state drive, a hard disk drive, or the like.

Functional Configuration of Information Processing Apparatus

Figure 7:
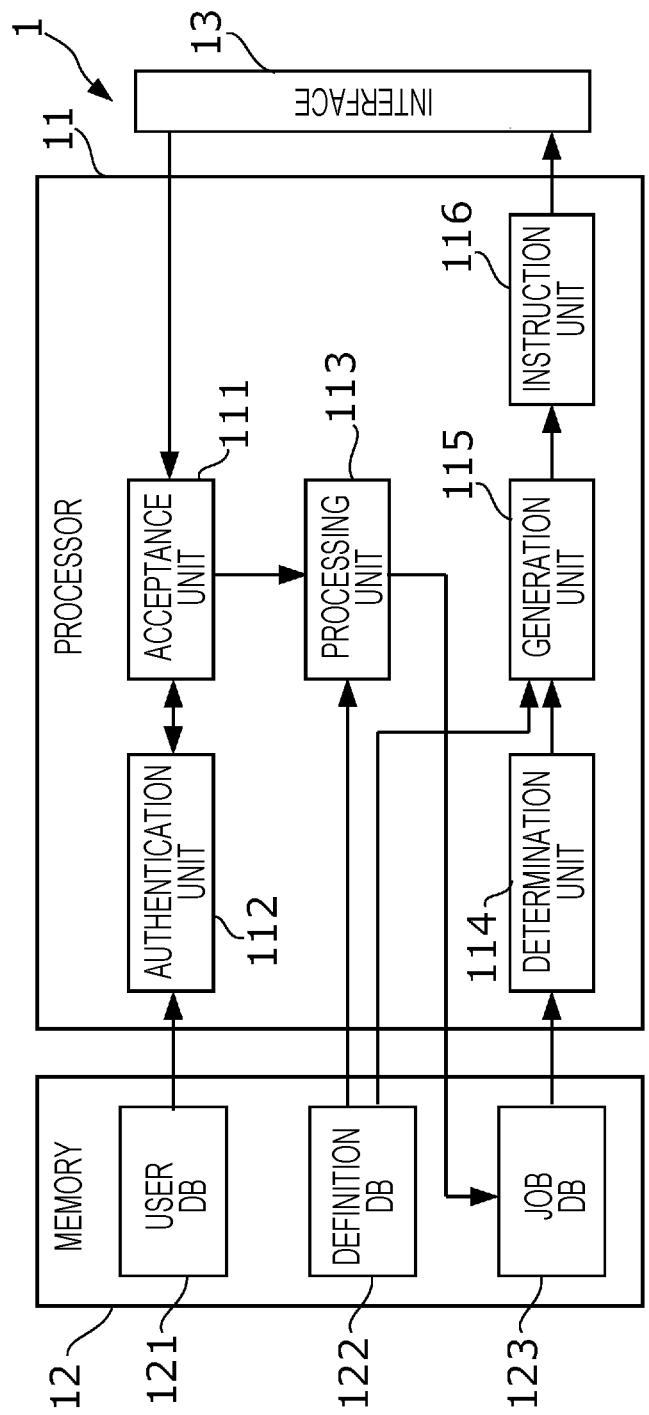
FIG. 7 illustrates an example of a functional configuration of the information processing apparatus.

FIG. 7 illustrates an example of a functional configuration of the information processing apparatus 1. By executing a program stored in the memory 12, the processor 11 of the information processing apparatus 1 functions as an acceptance unit 111, an authentication unit 112, a processing unit 113, a determination unit 114, a generation unit 115, and an instruction unit 116.

The acceptance unit 111 accepts a user operation from the terminal 2 through the interface 13. First, the acceptance unit 111 accepts authentication information that a user inputs by operating the operation unit 24 of the terminal 2. After authentication has succeeded, the acceptance unit 111 accepts an operation indicating a request to the information processing apparatus 1 from the authenticated user.

Referring to the user DB 121, the authentication unit 112 performs authentication based on the authentication information accepted by the acceptance unit 111. If the authentication is successful, the authentication unit 112 informs the acceptance unit 111 that the authentication is successful.

In accordance with the operation accepted by the acceptance unit 111 from the authenticated user, the processing unit 113 performs processing for a process in any of jobs. By referring to the definition DB 122, the processing unit 113 determines the definition of the workflow to which the operated job belongs, and advances the processing in accordance with the operation and updates information about the job written in the job DB 123.

Upon the acceptance unit 111 accepting a user operation for selecting a workflow, the determination unit 114 reads, for each job to be processed in the selected workflow, the progress information thereof by referring to the job DB 123 and determines the progress of processes in the job.

The generation unit 115 reads first images respectively representing two or more processes constituting the workflow selected by the user from the definition DB 122, and, based on the read first images and the progress of processes determined by the determination unit 114, generates a new single image, which is a second image. The "single image" herein is a group of images expressed in a single region, such as an icon. Since the user recognizes the single image as an integrated one image, the user grasps all constituents included in the single image by looking at the single image. For example, the generation unit 115 edits and processes each of the first images in accordance with the corresponding progress and arranges the first images in a predetermined order to generate the second image.

The instruction unit 116 sends image data representing the second image generated by the generation unit 115 to the terminal 2 through the interface 13 and instructs the terminal 2 to display the second image based on the image data.

Operations of Information Processing Apparatus

Figure 8:
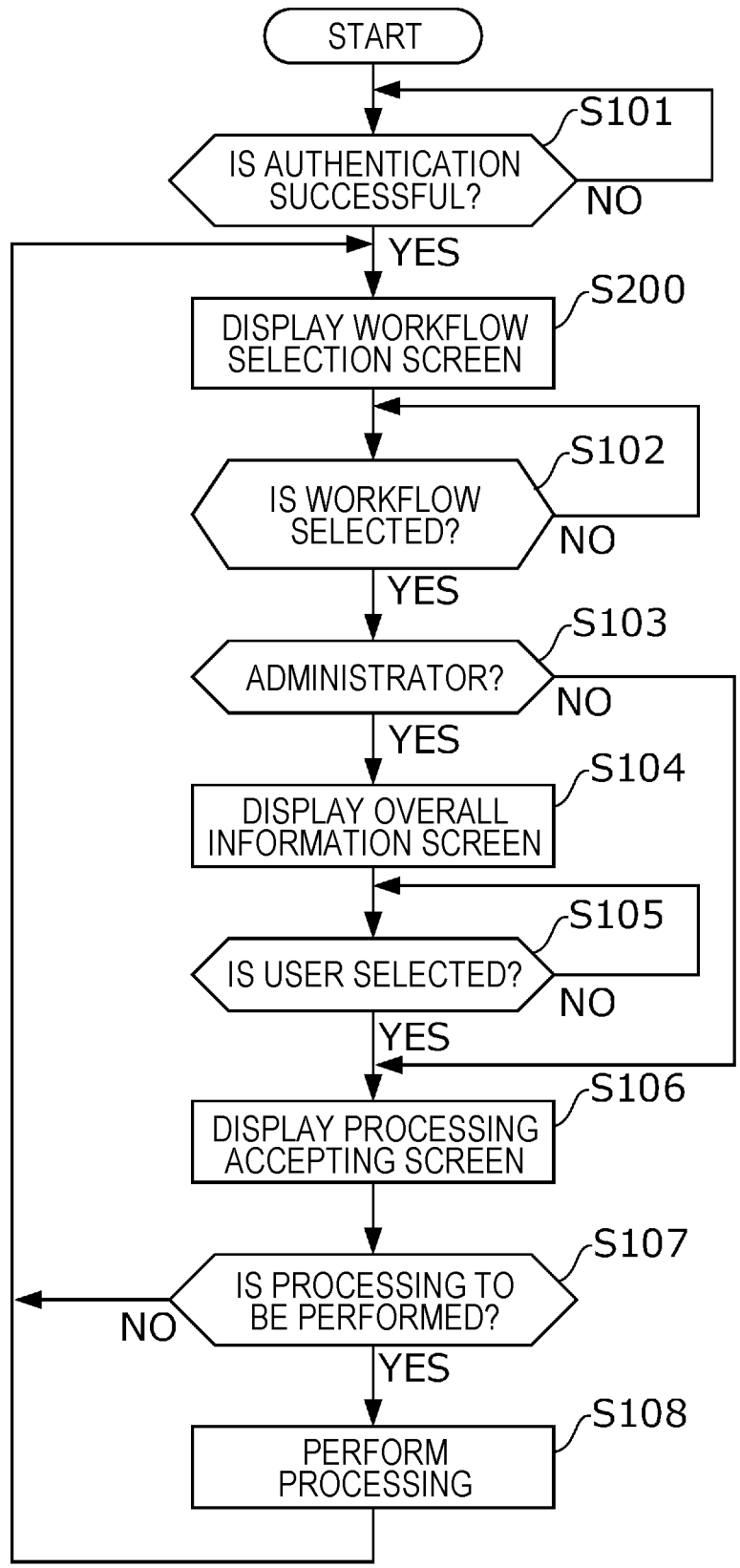
FIG. 8 is a flowchart illustrating an example of a flow of operations of the information processing apparatus.

FIG. 8 is a flowchart illustrating an example of a flow of operations of the information processing apparatus 1. The processor 11 of the information processing apparatus 1 acquires authentication information of a user from the terminal 2 through the interface 13 and performs authentication by using the user DB 121. The processor 11 determines whether the authentication is successful (step S101). While it is determined that the authentication is unsuccessful (step S101; NO), the processor 11 repeats this determination. On the other hand, if it is determined that the authentication is successful (step S101; YES), the processor 11 instructs the terminal 2 to display a workflow selection screen (step S200).

Figure 9:
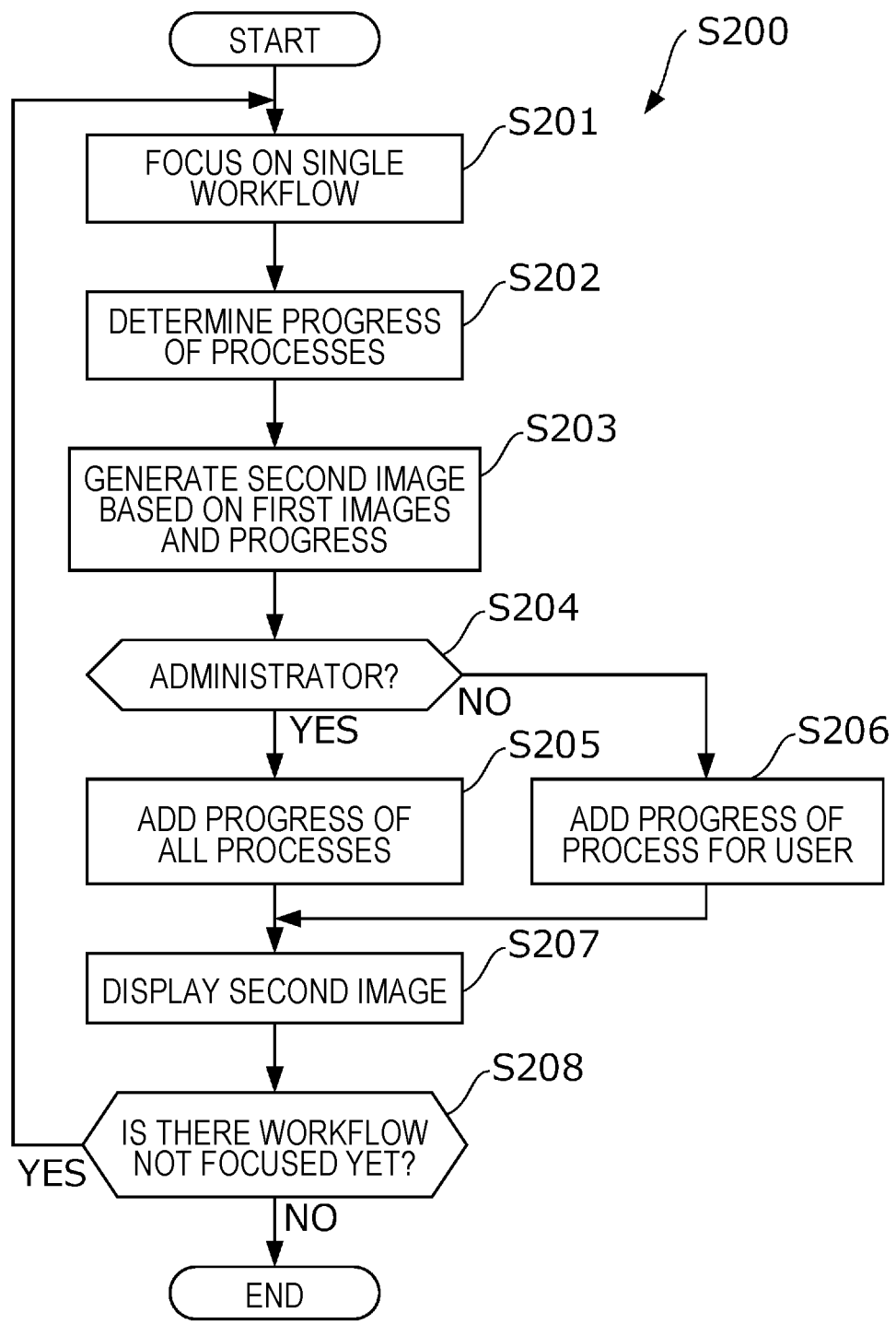
FIG. 9 is a flowchart illustrating an example of a flow of operations for displaying a workflow selection screen.

FIG. 9 is a flowchart illustrating an example of a flow of operations for displaying the workflow selection screen. Referring to the job DB 123 stored in the memory 12, among the workflow IDs that are listed in the workflow list 1231 and are yet to be focused, the processor 11 focuses on any one of the workflow IDs (step S201). Subsequently, referring to the job table 1232 associated with the focused workflow ID, the processor 11 determines the progress of processes constituting the workflow identified by the workflow ID (step S202).

Upon determining the progress of the processes, referring to the definition DB 122, the processor 11 determines the first images represented by image data associated with the processes, respectively. Subsequently, the processor 11 generates the second image based on the first images respectively representing the processes and the progress of the processes (step S203).

For example, in a case where the workflow identified by the focused workflow ID is constituted by three processes, the processor 11 acquires image data representing the first images respectively corresponding to the three processes from the definition DB 122. In addition, as progress information of the respective three processes, the processor 11 determines the numbers of jobs yet to be processed (referred to as numbers of standby jobs) in the process. Subsequently, the processor 11 increases or decreases the sizes of the first images, respectively representing the three processes, in accordance with the numbers of standby jobs in these processes and arranges the first images in a predetermined order to generate a new single image, which is the second image.

Subsequently, referring to the attribute information in the user DB 121, the processor 11 determines whether a user who operates the terminal 2 is a user having authority to manage the workflow (referred to as administrator) (step S204). If it is determined that the user is the administrator (step S204; YES), the processor 11 adds the progress of all the processes in the focused workflow to the second image (step S205), and advances the processing to step S207.

On the other hand, if it is determined that the user is not the administrator (step S204; NO), the processor 11 adds the progress of the process for the user (also referred to as typical user), who is not the administrator, to the second image (step S206), and advances the processing to step S207.

Subsequently, the processor 11 instructs the terminal 2 to display the second image to which the progress is added in step S205 or step S206 (step S207).

The processor 11 determines whether there is a workflow ID that is not focused yet among the workflow IDs listed in the workflow list 1231 (step S208). If it is determined that there is a workflow ID that is not focused yet (step S208; YES), the processor 11 returns the processing to step S201. On the other hand, if it is determined that there is no workflow ID that is not focused (step S208; NO), the processor 11 ends the processing.

Figure 10:
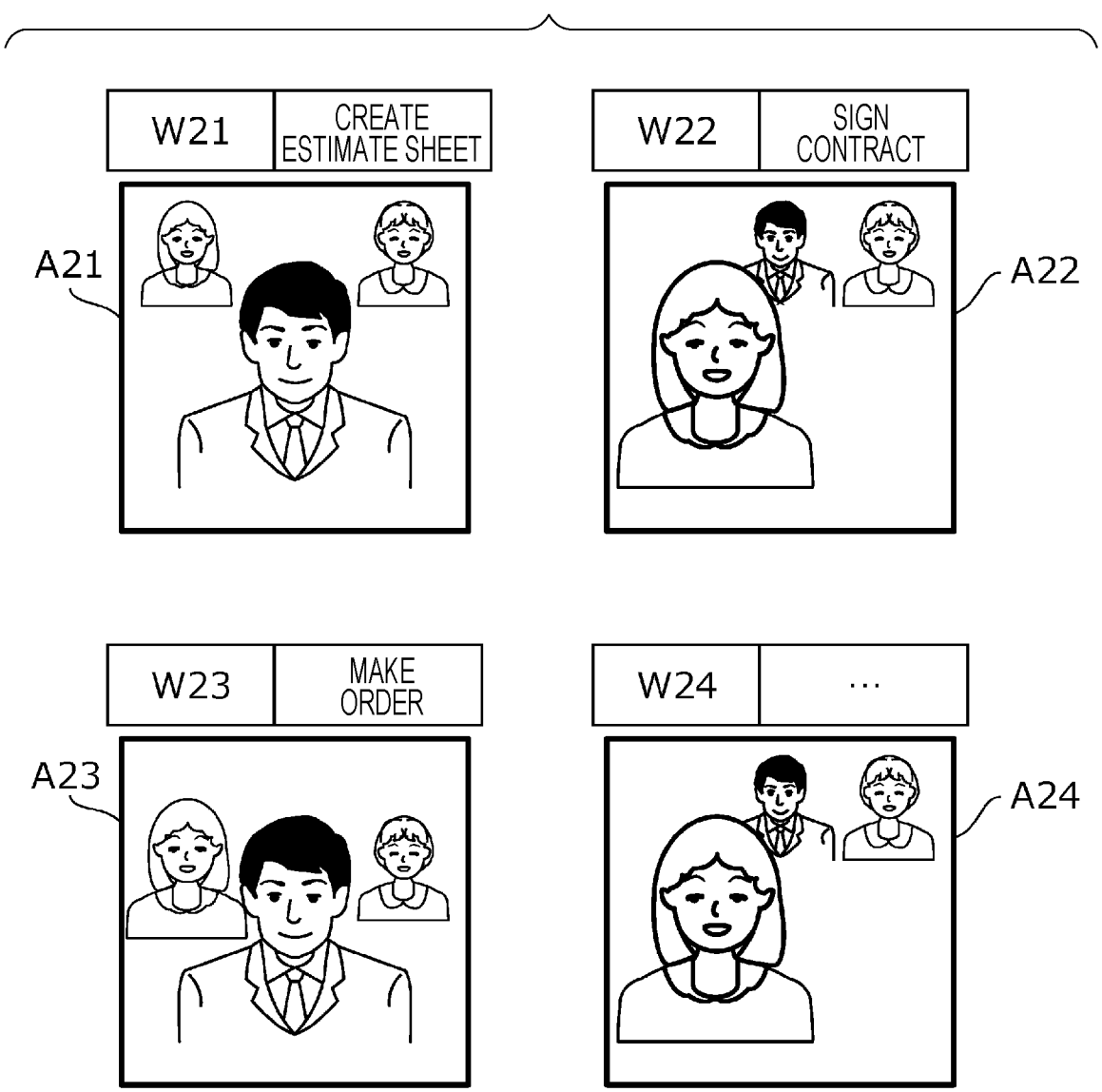
FIG. 10 illustrates an example of the workflow selection screen.

FIG. 10 illustrates an example of the workflow selection screen. Through the above operations, for each of the workflow IDs listed in the workflow list 1231 in the job DB 123, the second image is generated and displayed. The second image is a so-called icon and generated in accordance with the progress of jobs in the corresponding workflow. For example, second images A21, A22, A23, and A24 illustrated in FIG. 10 are icons indicating the progress of jobs registered to be processed in accordance with the workflows identified by the workflow IDs "W21", "W22", "W23", and "W24", respectively. Each of the second images includes person images (examples of the first images) respectively representing two or more processes. The size of each person image is in accordance with the progress of the corresponding process. In the second images, the person images respectively representing the processes are arranged in a processing order of the processes from the left to the right.

Figure 11:
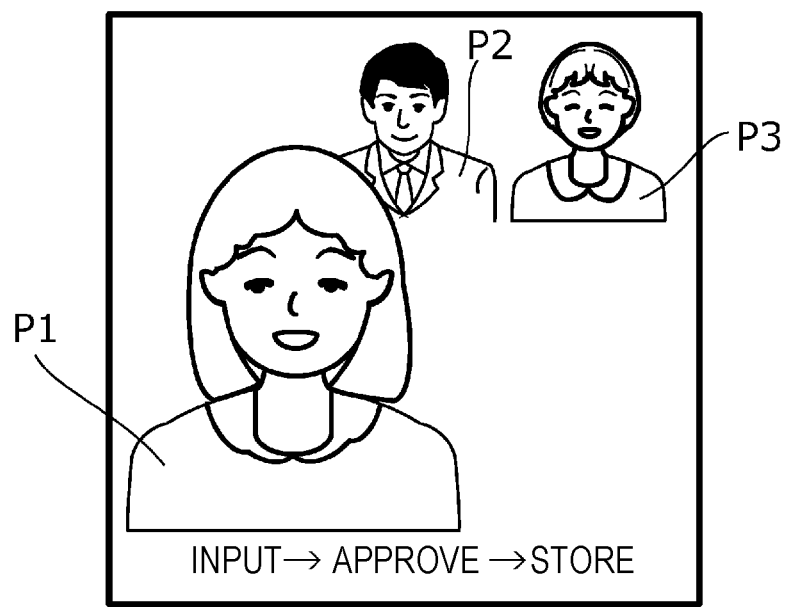
FIG. 11 illustrates an example of a second image displayed when there are no standby jobs.

FIG. 11 illustrates an example of the second image displayed when there are no standby jobs. The standby job is a job for which processing is not advanced in any of processes in a workflow and the following processes are in a standby state. In the second image illustrated in FIG. 11, three first images, which are a first image P1, a first image P2, and a first image P3, are arranged in a predetermined order.

The first image P1 illustrated in FIG. 11 is arranged on the left in the second image. This indicates that the first image P1 corresponds to the process with the process number "1", that is, the process to be processed first, in the workflow illustrated by the second image. In addition, the first image P1 illustrated in FIG. 11 is depicted to be larger than the other first images. This indicates that there are no standby jobs in the workflow and the first process is in a standby state. Note that the same expression is employed also in a case where a large number of standby jobs are accumulated in the first process.

Figure 12:
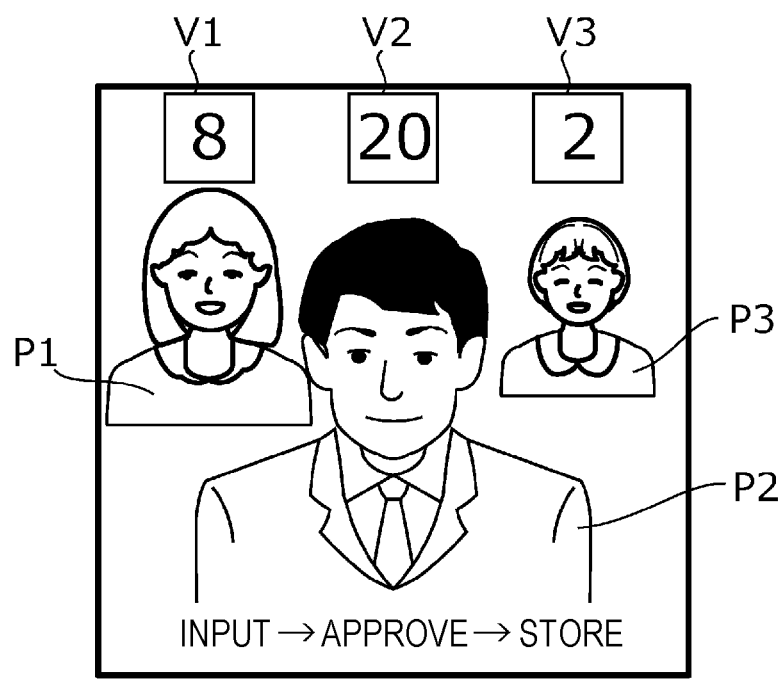
FIG. 12 illustrates an example of the second image displayed for the administrator.

FIG. 12 illustrates an example of the second image displayed for the administrator. The administrator is expected to grasp the overall workflow progress and to recognize the user who is in charge of a delayed process in the workflow. Depending on the progress, the administrator may be expected to advance the processing by proxy for the user who is in charge of the process. Thus, in association with each of the first images included in the second image, the processor 11 adds a symbol representing the progress of the corresponding process for the administrator.

That is, in the second image displayed for the administrator, as illustrated in FIG. 12 for example, symbols V1, V2, and V3 are added above the three first images P1, P2, and P3, respectively. The symbol V1 is information indicating the progress of the process represented by the first image P1, the symbol V2 is information indicating the progress of the process represented by the first image P2, and the symbol V3 is information indicating the progress of the process represented by the first image P3. Herein, the information indicates the above number of standby jobs.

For example, in the second image illustrated in FIG. 12, the number of standby jobs is "8" for the process with the process number "1" represented by the first image P1. In addition, the number of standby jobs is "20" for the process with the process number "2" represented by the first image P2, and the number of standby jobs is "2" for the process with the process number "3" represented by the first image P3. The process with the largest number of standby jobs in these three processes is the process with the process number "2". Thus, the first image P2 illustrated in FIG. 12 is depicted to be larger than the first image P1 and the first image P3.

By glancing at the second image illustrated in FIG. 12, the administrator is able to recognize the numbers of standby jobs in the three processes constituting the workflow indicated by the second image.

Figure 13A:
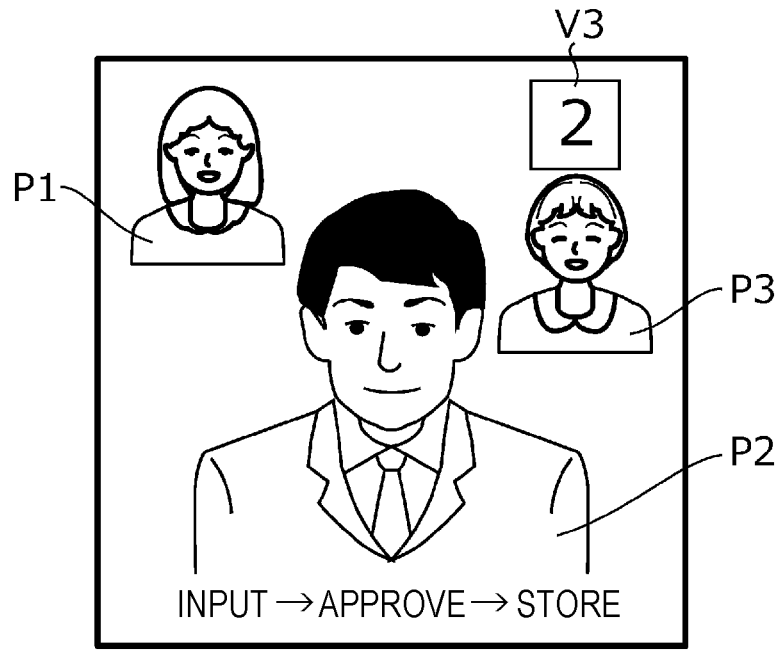
FIGS. 13A and 13B illustrate examples of the second image displayed for a typical user.
Figure 13B:
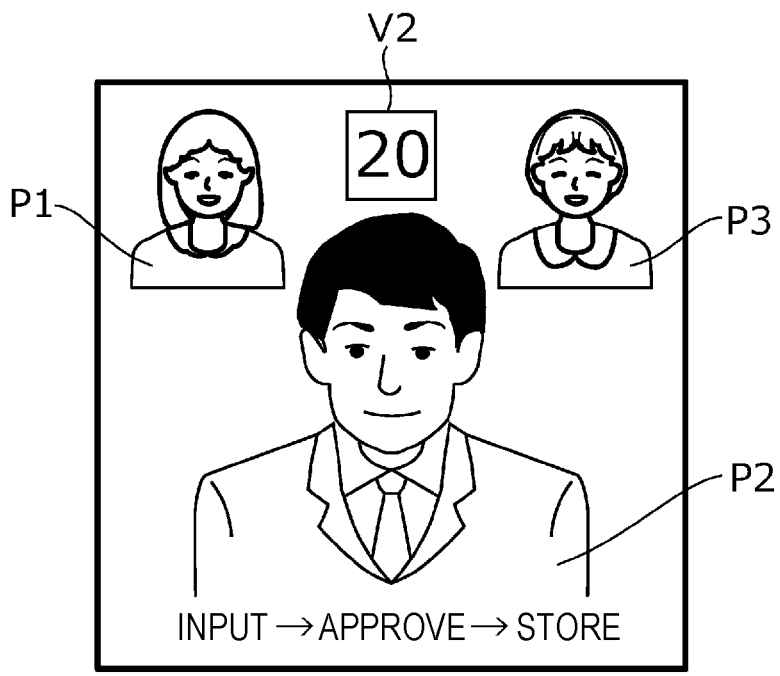

FIGS. 13A and 13B illustrate examples of the second image displayed for a typical user. Unlike the administrator, information on the process of the typical user who is in charge of the process suffices them. Thus, the processor 11 adds the symbol indicating the progress of the process of the typical user to the second image displayed for them.

For example, in the second image illustrated in FIG. 13A, the first image P1, the first image P2, and the first image P3 are arranged in a predetermined order, and the symbol V3 is added above the first image P3 among the three first images. This is because the user of the terminal 2 is in charge of the process with the process number "3" represented by the first image P3. By looking at the second image illustrated in FIG. 13A, the typical user recognizes that the process with the most delayed progress in this workflow is the second process and that the number of standby jobs in the third process of which they are in charge is "2".

In a case where the typical user is in charge of the second process, the second image illustrated in FIG. 13B is displayed on the terminal 2 operated by them. In the second image illustrated in FIG. 13B, the first image P1, the first image P2, and the first image P3 are arranged in a predetermined order, and the symbol V2 is added above the first image P2 among the three first images. In this case, the typical user recognizes that the process with the most delayed progress in this workflow is the second process of which they are in charge and that the number of standby jobs therein is "20".

The processor 11 that instructs the terminal 2 to display any of these second images is an example of a processor that determines the progress of each of two or more processes included in the workflow and displays the second image that is a single image generated based on the first images respectively representing the two or more processes and the determined progress.

In particular, the processor 11 that causes the terminal 2 to display any of the above second images is an example of a processor that determines the progress based on the number of standby jobs in each of the two or more processes.

In particular, the processor 11 that causes the terminal 2 to display any of the above second images is an example of a processor that displays the second image generated by changing the size of each of the first images in accordance with the progress. Note that the processor 11 may generate the second image including the first images representing the processes in a manner in accordance with the progress of the processes. For example, the processor 11 may represent each of the first images representing the processes by, not changing the size thereof in accordance with the progress of the corresponding process, a color (density, luminance, brightness, or transparency) in accordance with the progress of the process. The processor 11 also may change the thickness of lines in each of the first images in accordance with the progress.

In particular, the processor 11 that causes the terminal 2 to display any of the above second images is an example of a processor that displays the second image generated by adding, in association with each of the first images, a symbol indicating the progress.

In particular, the processor 11 that causes the terminal 2 to display any of the above second images is an example of a processor that displays the second image generated by arranging the first images in a predetermined order. Note that the processor 11 does not necessarily arrange the first images in a predetermined order as long as a user grasps the processing order of the processes represented by the first images included in the second image. For example, the processor 11 may generate a second image in which the first images respectively representing two or more processes are connected by arrows in accordance with the processing order of the processes.

In particular, in the above second images, depending on whether the symbol indicating the progress is added above a first image, the first image represents or does not represent the process of which a user is in charge. That is, the processor 11 is an example of a processor that determines a user and displays, among the first images, a first image representing a process of which the user is in charge, among two or more processes, in a manner distinguished from another first image.

In FIG. 8, upon performing step S200, the processor 11 determines whether a user who has looked at the displayed workflow selection screen selects a workflow (step S102). While it is determined that the user does not select a workflow (step S102; NO), the processor 11 repeats this determination. If it is determined that the user selects a workflow (step S102; YES), the processor 11 determines whether the user is the administrator (step S103).

If it is determined that the user is the administrator (step S103; YES), the processor 11 instructs the terminal 2 to display an "overall information screen" indicating information on all processes constituting the selected workflow (step S104).

Figure 14:
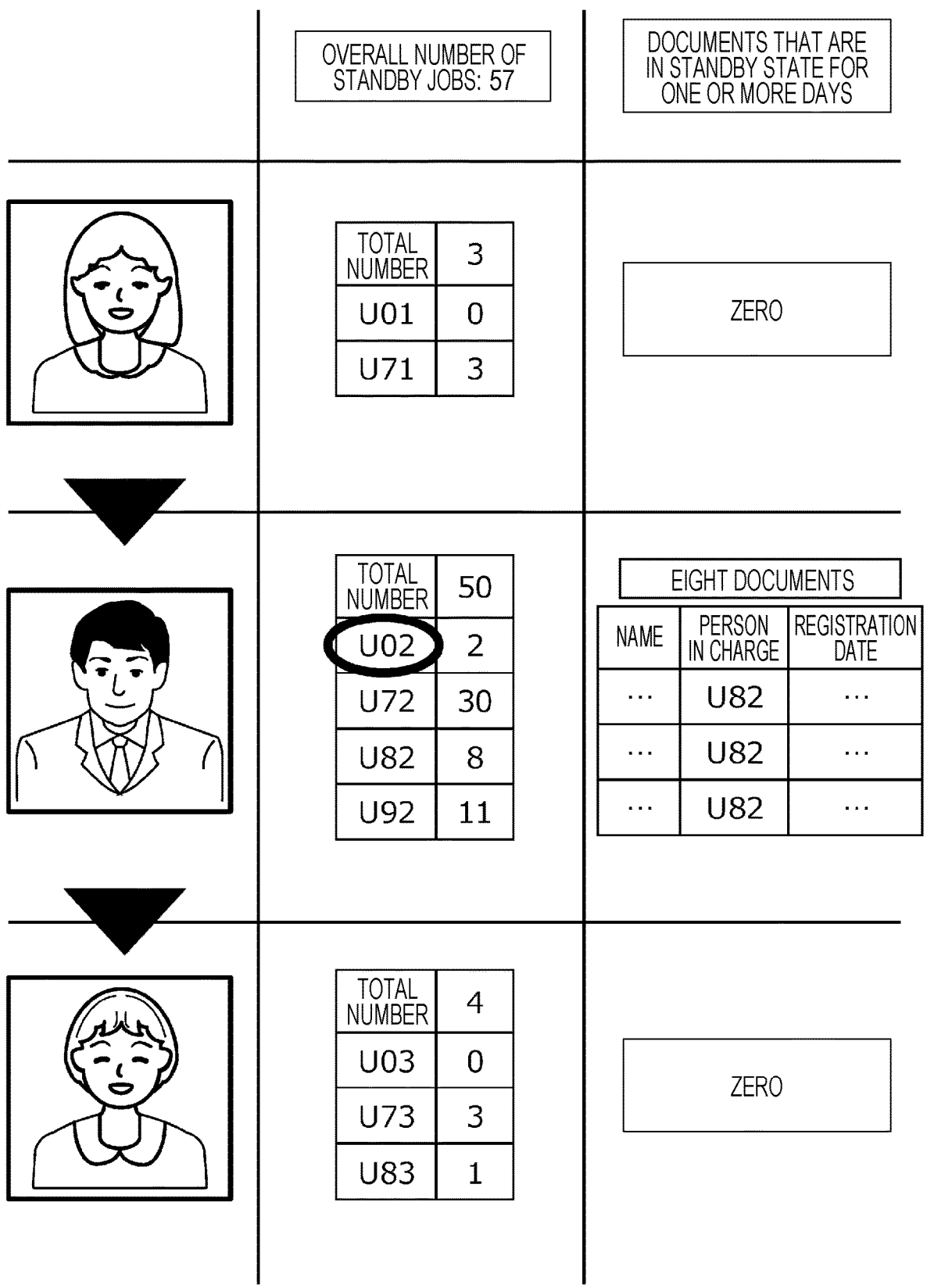
FIG. 14 illustrates an example of an overall information screen.

FIG. 14 illustrates an example of the overall information screen. The overall information screen illustrated in FIG. 14 is a screen indicating the overall status of the workflow selected by a click operation or the like on any of the second images on the workflow selection screen illustrated in FIG. 10. The overall information screen illustrated in FIG. 14 is constituted by three columns, in which two or more first images arranged in the second image are individually displayed in the left column. Each row on the overall information screen is associated with a corresponding process constituting the workflow, and processes with the process numbers "1", "2", and "3" are arranged from the top.

The center column on the overall information screen illustrated in FIG. 14 is a column for displaying the number of standby jobs, and the overall number of standby jobs is indicated on the top row. In FIG. 14, "overall number of standby jobs: 57" is displayed in this part, and thus, the administrator looking at this knows that the overall number of standby jobs in the selected workflow is 57. In addition, in the center column on each row, the total number of standby jobs in the process associated with the row and the number of standby jobs for each user in charge are displayed.

Thus, for example, the overall information screen illustrated in FIG. 14 indicates that, in the process identified by the process number "1", the total number of standby jobs is "3" and that the user identified by the user ID "U71" is in charge of all of the standby jobs.

The right column on the overall information screen illustrated in FIG. 14 is a column for displaying whether there is a document that is in a standby state for one or more days and the number of such documents. Thus, for example, the overall information screen illustrated in FIG. 14 indicates that, in the process identified by the process number "1", there is no document that is in a standby state for one or more days. In addition, the overall information screen illustrated in FIG. 14 also indicates that the process identified by the process number "2" includes eight documents that are in a standby state for one or more days, and further indicates information such as the names of the documents, the persons in charge, and the registration dates on which the documents are registered.

On the overall information screen illustrated in FIG. 14, if the administrator performs a click operation or the like on any of the user IDs written in the center column, the processor 11 instructs the terminal 2 to display for the administrator a screen that is to be displayed for the user identified by the operated user ID if the user selects a workflow. For example, upon clicking the user ID "U02" surrounded by an oval on the overall information screen illustrated in FIG. 14, the administrator views a processing accepting screen that is to be displayed for the user identified by the user ID "U02" if the user selects a workflow on the workflow selection screen.

The processor 11 determines whether the administrator selects any user ID indicating a user on the overall information screen displayed in step S104 illustrated in FIG. 8 (step S105). While it is determined that the administrator does not select any user (step S105; NO), the processor 11 repeats this determination. If it is determined that the administrator selects any user (step S105; YES), the processor 11 advances the processing to step S106.

In addition, if it is determined in step S103 that the user who operates the terminal 2 is not the administrator (step S103; NO), the processor 11 advances the processing to step S106.

If the user who operates the terminal 2 is a typical user in step S106, the processor 11 instructs the terminal 2 to display the processing accepting screen for the user (step S106). If the user who operates the terminal 2 is the administrator in step S106, the processor 11 instructs the terminal 2 to display the processing accepting screen for a user selected by the administrator on the overall information screen (step S106).

Figure 15:
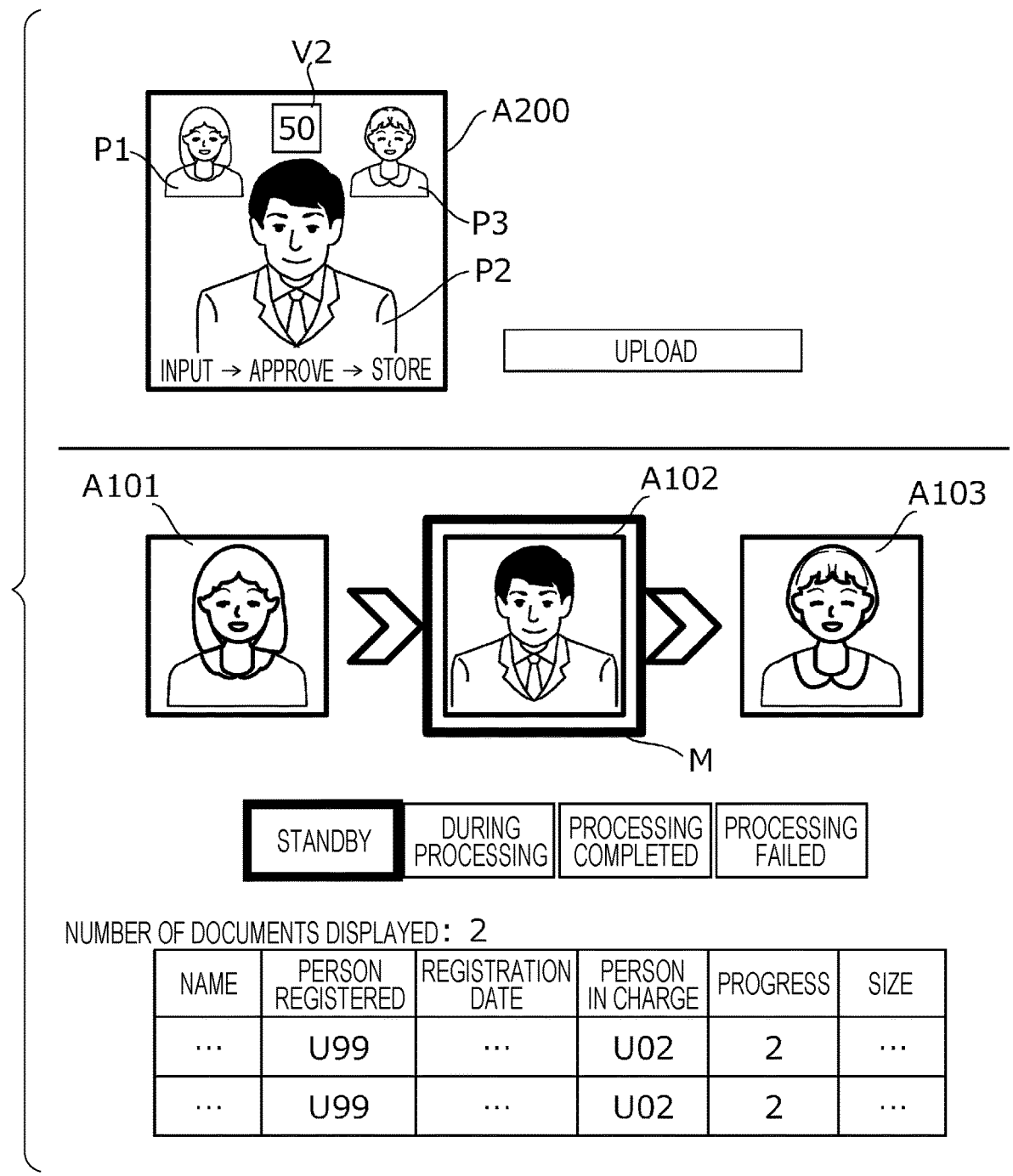
FIG. 15 illustrates an example of a processing accepting screen.

FIG. 15 illustrates an example of the processing accepting screen. On the processing accepting screen illustrated in FIG. 15, a second image A200 is displayed in an upper part, the second image A200 being an icon representing a workflow selected by the user. In the second image A200, the first images P1, P2, and P3, which are three person images, are arranged in this order from the left to the right, and the first image P2 is depicted to be larger than the other first images. In addition, the symbol V2 representing the number of standby jobs "50" is added above the first image P2. Note that there is a button labeled as the character string "upload"

on the right of the second image A200. In response to the user pressing this button, a new job is added to this workflow.

As illustrated in FIG. 15, on this processing accepting screen, the division line extends horizontally below the upper part, a lower part is provided below the division line, and first images A101, A102, and A103 respectively representing three processes constituting this workflow are displayed in the lower part. These first images are arranged in a processing order from the left to the right.

As described above, in the second image A200 representing the selected workflow, the first image P2 is depicted to be larger than the other first images. In accordance with this, a frame M is depicted around the first image A102, which represents the second process as the first image P2 does. The frame M indicates that the process represented by the first image A102 surrounded by the frame M has the largest number of standby jobs in this workflow.

That is, in response to the user performing an operation on the second image, the processor 11 individually displays the first images, respectively representing two or more processes constituting the workflow represented by the operated second image, in a manner in accordance with the progress of the processes. That is, the processor 11 is an example of a processor that, in a case where an operation on the second image is accepted, individually displays each of the first images representing two or more processes in a manner in accordance with the progress thereof.

In particular, on the processing accepting screen illustrated in FIG. 15, the frame M is depicted around the first image A102 representing the second process with the most delayed progress. That is, the processor 11 of the information processing apparatus 1 causes the terminal 2 to display the first image A102 representing the process with more delayed progress than other processes to be distinguished from the first image A101 and the first image A103. Thus, the processor 11 is an example of a processor that, in a case where an operation on the second image is accepted, displays a first image representing one process with more delayed progress than another process, among two or more processes, to be distinguished from another first image representing the other process.

In the lower part of the processing accepting screen illustrated in FIG. 15, buttons labeled as character strings "standby", "during processing", "processing completed", and "processing failed" are displayed below the first images A101, A102, and A103. These buttons are used for narrowing down jobs to be processed in the second process represented by the first image A102 surrounded by the frame M. These buttons are so-called radio buttons, and if any of the four buttons is selected, the other three buttons become unavailable.

In the example illustrated in FIG. 15, "standby" is selected from among these four buttons, and thus, a table of information about standby jobs among jobs to be processed in the second process is displayed below these buttons. Herein, if the user who operates the terminal 2 is a typical user, this table displays jobs for them. In addition, if the user who operates the terminal 2 is the administrator, this table displays jobs for a user selected by the administrator on the overall information screen.

Upon displaying the processing accepting screen, the processor 11 determines whether there is processing to be performed by an operation on the processing accepting screen (step S107). If it is determined that there is no processing to be performed (step S107; NO), the processor 11 returns the processing to step S200.

On the other hand, if it is determined that there is processing to be performed (step S107; YES), the processor 11 performs the processing designated by the operation (step S108) and returns the processing to step S200.

Through the above operations, the information processing apparatus 1 of the information processing system 9 expresses each workflow by using the second image, which is a single image generated based on the progress of processes constituting the workflow and the first images representing the processes. Thus, a user is able to grasp a process with delayed processing in the workflow represented by the second image.

Modifications

The exemplary embodiment has been described above. Details of the exemplary embodiment may be modified as follows. In addition, the following modifications may be combined with one another.

First Modification

In the exemplary embodiment above, the information processing apparatus 1 includes the processor 11 constituted by a CPU. However, the information processing apparatus 1 may also be controlled by another constituent. For example, the information processing apparatus 1 may include any of various processors other than the CPU.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Second Modification

In the embodiments above, the term "processor" is broad enough to encompass one processor or plural processors in collaboration which are located physically apart from each other but may work cooperatively.

The order of operations of the processor is not limited to one described in the embodiments above, and may be changed.

Third Modification

In the exemplary embodiment above, the information processing apparatus 1 may also have the functions of the terminal 2. In this case, the information processing apparatus 1 may include a component corresponding to the operation unit 24 and the display unit 25 in the terminal 2.

Fourth Modification

In the exemplary embodiment above, the processor 11 determines the progress of a process based on the number of standby jobs. However, the progress of a process may also be determined by another index. For example, the processor 11 may determine the progress of a process based on a total time during which a job is left in a standby state in the process.

That is, the processor 11 in this case is an example of a processor that determines the progress of a process based on a time during which a job is in a standby state in the process.

Fifth Modification

In the exemplary embodiment above, the information processing system 9 includes the single information processing apparatus 1. However, the information processing system 9 may alternatively include plural information processing apparatuses 1 that are communicably connected to each other and may implement a cluster system in which functions are shared therebetween.

In this case, the information processing system 9 is an example of an information processing system including plural information processing apparatuses that are communicably connected to each other, in which any of the plural information processing apparatuses determines progress of each of two or more processes included in a workflow, generates a second image that is a single image based on first images respectively representing the two or more processes and the determined progress, and displays the second image.

Sixth Modification

In the exemplary embodiment above, a program executed by the processor 11 of the information processing apparatus 1 is an example of a program causing a computer including a processor to execute a process including: determining progress of each of two or more processes included in a workflow; and displaying a second image that is a single image generated based on first images respectively representing the two or more processes and the determined progress.

This program may be provided by being stored in a computer readable storage medium such as a magnetic storage medium, an optical storage medium, a magneto-optical storage medium, or a semiconductor memory. The magnetic storage medium may be a magnetic tape, a magnetic disk, or the like. The optical storage medium may be an optical disk. Alternatively, this program may be downloaded via a communication line such as the Internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
   determine progress of each of two or more processes included in a workflow and
   display a second image that is a single image generated based on first images respectively representing the two or more processes and the determined progress,
wherein the processor is configured to display the second image generated by changing the size of each of the first images in accordance with a number of standby jobs in each of the two or more processes or a time during which a job is in a standby state in each of the two or more processes.

2. The information processing apparatus according to claim 1,
wherein the size of each of the first images is changed in accordance with the time during which the job is in the standby state in each of the two or more processes.

3. The information processing apparatus according to claim 2,
wherein the processor is configured to display the second image generated by adding, in association with each of the first images, a symbol indicating the progress.

4. The information processing apparatus according to claim 1,
wherein the size of each of the first images is changed in accordance with a number of standby jobs in each of the two or more processes.

5. The information processing apparatus according to claim 4,
wherein the processor is configured to display the second image generated by adding, in association with each of the first images, a symbol indicating the progress.

6. The information processing apparatus according to claim 1,
wherein the processor is configured to display the second image generated by adding, in association with each of the first images, a symbol indicating the progress.

7. The information processing apparatus according to claim 1,
wherein the processor is configured to display the second image generated by arranging the first images in a predetermined order.

8. The information processing apparatus according to claim 1,
wherein the processor is configured to, in a case where an operation on the second image is accepted, individually display each of the first images in a manner in accordance with the progress.

9. The information processing apparatus according to claim 8,
wherein the processor is configured to, in a case where an operation on the second image is accepted, display a first image representing one process with more delayed progress than another process, among the two or more processes, to be distinguished from another first image representing the other process.

10. The information processing apparatus according to claim 1,
wherein the processor is configured to
   determine a user and
   display, among the first images, a first image representing a process of which the user is in charge, among the two or more processes, in a manner distinguished from another first image.

11. The information processing apparatus according to claim 1, wherein the first images are representations of respective ones of a plurality of users assigned to at least one of the two or more processes in the workflow.

12. The information processing apparatus according to claim 1, wherein the processor is further configured to determine whether a viewing user is an administrator user, the second image is displayed to the viewing user, and, when the viewing user is determined to be the administrator user, the second image includes a number of standby processes for each of the plurality of first images, and when the viewing user is not determined to be the administrator user, the second image include a number of standby processes for only one of the first images, the one first image being an image corresponding to the viewing user.

13. A non-transitory computer readable medium storing a program causing a computer including a processor to execute a process for information processing, the process comprising:
   determining progress of each of two or more processes included in a workflow and
   displaying a second image that is a single image generated based on first images respectively representing the two or more processes and the determined progress,
   wherein the displaying of the second image is generated by changing the size of each of the first images in accordance with a number of standby jobs in each of the two or more processes or a time during which a job is in a standby state in each of the two or more processes.

* * * * *